United States Patent
Ikeda et al.

(10) Patent No.: US 12,542,012 B2
(45) Date of Patent: Feb. 3, 2026

(54) TEST SYSTEM, CONTROL DEVICE, TEST METHOD, AND TEST SYSTEM PROGRAM

(71) Applicant: HORIBA, LTD., Kyoto (JP)

(72) Inventors: Hiroyuki Ikeda, Kyoto (JP); Tatsuya Yoshimura, Kyoto (JP)

(73) Assignee: HORIBA, LTD. (JP)

( * ) Notice: Subject to any disclaimer, the term of this patent is extended or adjusted under 35 U.S.C. 154(b) by 246 days.

(21) Appl. No.: 18/022,369

(22) PCT Filed: Aug. 18, 2021

(86) PCT No.: PCT/JP2021/030186
§ 371 (c)(1),
(2) Date: Feb. 21, 2023

(87) PCT Pub. No.: WO2022/039194
PCT Pub. Date: Feb. 24, 2022

(65) Prior Publication Data
US 2023/0401904 A1 Dec. 14, 2023

(30) Foreign Application Priority Data
Aug. 21, 2020 (JP) .................................. 2020-140409

(51) Int. Cl.
*G07C 5/02* (2006.01)
*B60W 60/00* (2020.01)
(Continued)

(52) U.S. Cl.
CPC ............... *G07C 5/02* (2013.01); *G01M 15/10* (2013.01); *G06F 30/20* (2020.01); *G07C 5/0808* (2013.01); *B60W 60/00* (2020.02)

(58) Field of Classification Search
CPC ....... G07C 5/02; G07C 5/0808; G01M 15/10; G01M 17/0072; G06F 30/20; B60W 60/00; B60W 2050/0028; B60W 50/04
See application file for complete search history.

(56) References Cited

U.S. PATENT DOCUMENTS

2013/0317775 A1* 11/2013 Uratani ............... G01M 17/007
 702/113
2017/0371988 A1* 12/2017 Yamada ........... G05B 19/41815

FOREIGN PATENT DOCUMENTS

CN 105092260 A 11/2015
JP 2004361292 A * 12/2004
(Continued)

OTHER PUBLICATIONS

"Public Notice that Prescribes Details of Safety Regulations for Road Transport Vehicles" (Public Notice of MLIT No. 619, 2002), Appendix "Technical standard for onboard failure diagnostic apparatus related to device for preventing emission of sooth, malodorous gas, harmful gas, and the like of automobile".
(Continued)

*Primary Examiner* — Anne Marie Antonucci
*Assistant Examiner* — Jewel A Kuntz
(74) *Attorney, Agent, or Firm* — Brooks Kushman P.C.

(57) ABSTRACT

A test system for testing a test piece that is a vehicle or a part of the vehicle including a sensor and an electronic control device including a vehicle diagnostic function that acquires an output signal from the sensor, and that makes a diagnosis of the vehicle or the part of the vehicle, the test system includes a simulation signal generation device that is provided on a line between the sensor and the electronic control device, and that outputs a simulation signal simulating an output signal from the sensor to the electronic control device, a control unit that controls the simulation signal generation device to generate a simulation signal, and a storage unit that stores therein the generated simulation signal and an output signal that is output from the electronic control device in response to an input of the simulation signal, in a manner associated with each other.

13 Claims, 4 Drawing Sheets

(51) Int. Cl.
    *G01M 15/10*     (2006.01)
    *G06F 30/20*     (2020.01)
    *G07C 5/08*     (2006.01)

(56) References Cited

FOREIGN PATENT DOCUMENTS

| JP | 2006184051 | A | | 7/2006 | | |
|----|------------|---|---|--------|---|---|
| JP | 2012255678 | A | | 12/2012 | | |
| JP | 5203984 | B2 | * | 6/2013 | ............. | G01D 21/00 |
| JP | 2016001174 | A | * | 1/2016 | .......... | G01M 17/007 |
| JP | 2016050826 | A | * | 4/2016 | | |
| KR | 20150073238 | A | | 7/2015 | | |

OTHER PUBLICATIONS

International Search Report dated Oct. 26, 2021 issued for International application No. PCT/JP2021/030186.
Office Action dated Jul. 16, 2025 issued in CN patent application No. 202180051124.0.

* cited by examiner

TEST SYSTEM, CONTROL DEVICE, TEST METHOD, AND TEST SYSTEM PROGRAM

CROSS-REFERENCE TO RELATED APPLICATIONS

This application is the U.S. national phase of PCT Application No. PCT/JP2021/030186 filed on Aug. 18, 2021, which claims priority to JP Patent Application No. 2020-140409 filed on Aug. 21, 2020, the disclosures of which are incorporated in their entirety by reference herein.

TECHNICAL FIELD

The present invention relates to a test system, a control device, a test method, and a test system program for an electronic control device having a vehicle diagnostic function.

BACKGROUND ART

Generally, an electronic control device provided to a vehicle has a vehicle diagnostic function, such as on-board diagnostics (OBD), that acquires output signals from a few hundred sensors that are mounted on the vehicle, and makes a diagnosis such as of a failure of the vehicle. There is a requirement for testing the vehicle diagnostic function of an electronic control device to verify that the vehicle diagnostic function works properly, before a manufactured vehicle is introduced to the market (for example, Non-Patent Document 1).

In such a test, a simulation signal generation device is provided on lines between the electronic control device and each of such sensors, to block output signals from the sensors, or to generate a simulation signals by converting output signals from the sensors into abnormal values, so as to simulate abnormal conditions of the vehicle. Conventionally, an examiner has conducted the test while driving a test vehicle in a predetermined driving pattern, by making operations on the simulation signal generation device so as to block an output signal from each of the sensors, for example, and by checking and recording whether the vehicle diagnostic function is working properly (for example, whether an alarm is activated properly).

CITATION LIST

Non-Patent Literature

Non-Patent Document 1: "Public Notice that Prescribes Details of Safety Regulations for Road Transport Vehicles" (Public Notice of MLIT No. 619, 2002). Appendix "Technical standard for onboard failure diagnostic apparatus related to device for preventing emission of sooth, malodorous gas, harmful gas, and the like of automobile"

SUMMARY OF THE INVENTION

Technical Problem

In the conventional test described above, the examiner is required to drive the test vehicle, to generate the simulation signals by making operations on the simulation signal generation device, and to record the simulation signals all at the same time. Moreover, the examiner is required repeat this process for each of the sensors an enormous number of times. Therefore, the examiner is demanded to have advanced skills and know-hows.

The present invention has been made in view of the problem described above, and a main object of the present invention is to make it easier to carry out a test for verifying the vehicle diagnostic function included in an electronic control device, without requiring any advanced skills or know-hows.

Solution to Problem

In other words, a test system according to the present invention tests a test piece that is a vehicle or a part of the vehicle that includes a sensor and an electronic control device having a vehicle diagnostic function that acquires an output signal from the sensor, and that makes a diagnosis of the vehicle or the part of the vehicle. The test system includes: a simulation signal generation device that is provided on a line between the sensor and the electronic control device, and that outputs a simulation signal simulating an output signal from the sensor, to the electronic control device; a control unit that controls the simulation signal generation device to generate a simulation signal; and a storage unit that stores therein the generated simulation signal and an output signal that is output from the electronic control device in response to an input of the simulation signal, in a manner associated with each other.

With this configuration, the control unit controls the simulation signal generation device to generate a simulation signal, and the generated simulation signal and the output signal output from the electronic control device at that time are stored in the storage unit in a manner associated with each other. Therefore, it is possible to use a computer to automate the task of generating a simulation signal and the task of recording the output signal output from the electronic control device in response thereto, the tasks having been conventionally done manually by the examiner while driving the vehicle. As a result, a test for verifying a vehicle diagnostic function such as OBD included in the electronic control device can be conducted easily without requiring any advanced skills or know-hows.

Note that the term "simulation signal" as used herein means signals including a signal simulating a normal condition of a sensor, a signal simulating an abnormal condition of the sensor, and a signal simulating a condition when the sensor is disconnected. The concept of "line" includes not only wired communication via wiring but also wireless communication.

As an embodiment for making an advantageous effect achieved by the present invention more prominent, the simulation signal generation device is provided on lines between the plurality of sensors and the electronic control device, and the control unit controls the simulation signal generation device to selectively block output signals from the plurality of respective sensors, or to selectively output abnormality simulation signals simulating abnormal conditions of the plurality of respective sensors to the electronic control device.

In this manner, because the simulation signal can be generated by automatically blocking the output signals of the plurality of sensors output to the electronic control device, it is possible to conduct a test in which the signals from the plurality of sensors need to be switched more easily.

In the test system, preferably, the storage unit further stores therein behavior information indicating how the test piece have behaved in response to an input of the simulation signal, also in an associated manner.

In this manner, it is possible to automatically record the behaviors of components under regulatory stipulations, such as an $O_2$ sensor and a throttle sensor, during the test, and to further achieve an automation of the test.

In order to run a test system on a test stand, the test piece may include an engine or a motor of the vehicle; the test system may further include a drive test device that drives the engine or the motor to test the test piece, and the control unit may be configured to generate the simulation signal while the engine or the motor is being driven by the drive test device.

Preferably, the test piece is a vehicle; the drive test device is a chassis dynamometer that performs a driving test of the test piece; and the storage unit stores therein information indicating a driving condition of the test piece in response to an input of the simulation signal, as the behavior information.

In this manner, it is possible to automatically record the driving condition under regulatory stipulations, such as the rotations of the engine, the speed of the vehicle, and the laboratory temperature, during the test. In this manner, it is possible to further achieve an automation of the test.

Preferably, the test system further includes an automatic driving robot that drives the test piece, and the control unit is configured to output the simulation signal to the electronic control device while the automatic driving robot is driving the test piece. In this manner, because the automatic driving robot drives the test piece in a manner synchronized with the test, the driving operation can be automated, and the test can be carried out more easily.

Depending on the type of sensors, when a simulation signal is input to the electronic control device, the electronic control device sometime changes the control of the engine. In other words, when this is applicable, the electronic control device changes the control of the engine so that the vehicle condition does not deteriorate, based on the result of a diagnosis (e.g., a failure type).

Therefore, preferably, in the test system, the electronic control device has a function for making a diagnosis of a failure of the vehicle as the vehicle diagnostic function, and the test system further includes: a control map storage unit that stores therein a plurality of control maps for controlling the automatic driving robot; an automatic driving robot control unit that controls the automatic driving robot by referring to a control map stored in the control map storage unit; and a failure type determination unit that receives an output signal from the electronic control device and determines a type of a failure in the test piece, wherein the automatic driving robot control unit switches the control map that is referred to, based on the type of the failure determined by the failure type determination unit.

In this manner, because the control map for controlling the automatic driving robot is switched depending on the type of a failure in the test piece, the operation by the automatic driving robot can cope with a change in the control of the engine, the change having been made by the electronic control device. The control map herein is data indicating a relationship between an accelerator position (accelerator opening) in a vehicle and a speed or acceleration of the vehicle, for example.

Depending on a testing organization, there is a requirement for collecting a measurement of exhaust gas from the test piece simultaneously, during the test.

Therefore, preferably, the test system further includes an exhaust gas analyzer that analyzes the exhaust gas emitted from the test piece, wherein the storage unit stores therein information indicating an analysis result of the exhaust gas analyzer, the analysis result being obtained in response to an input of the simulation signal, as the behavior information.

In this manner, the analysis result of the exhaust gas analyzer is recorded automatically. Therefore, the test can be further automated.

In order to make it easier to check a test result later, preferably, the generated simulation signal and the output signal output from the electronic control device in response to an input of the simulation signal are stored in a temporal order in the storage unit.

In order to enable the test result to be output automatically after the test is finished, preferably, the test system further includes a datasheet output unit that outputs a datasheet indicating a test result including the simulation signal and the output signal that are stored in the storage unit, the output signal being an output signal from the electronic control device and associated with the simulation signal.

Preferably, the test system further includes a test management unit that manages a schedule of a test for the electronic control device, and the test management unit controls to run a test of the electronic control device automatically in accordance with the schedule by outputting a command signal to the control unit, in accordance with the schedule.

In this manner, merely by inputting a test schedule to the test management unit in advance, an operator can cause the test management unit to run the test automatically, without the operator himself/herself making an operations of the devices to be controlled. In this manner, tests can be further automated, and conducted more easily.

It is preferable to further include an analysis result diagnostic unit that acquires and makes a diagnosis of an analysis result of the exhaust gas analyzer in real time, and the test management unit interrupts the test depending on the diagnosis result of the analysis result diagnostic unit.

The test system is also used in determining a threshold for enabling a failure diagnostic function to determine a failure type, during a development conformity stage of the electronic control device. The threshold for determining a failure type is determined by gradually incrementing the value of the simulation signal output to the electronic control device, for example, provided that this threshold to be determined is within a range in which the amount and the concentration of the exhaust gas emission from the vehicle are at levels equal to lower than predetermined upper boundaries, as stipulated in regulations. Therefore, by being provided with the configuration described above, for example, when the amount or the concentration of the exhaust gas analyzed by the exhaust gas analyzer exceeds the predetermined levels, the test can be interrupted at the item currently being tested, and automatically shifted to the next test item. In this manner, the time required in the development conformity test can be reduced.

Furthermore, a control device according to the present invention is for testing a test piece that is a vehicle or a part of a vehicle that includes a sensor and an electronic control device having a vehicle diagnostic function that acquires an output signal from the sensor, and that makes a diagnosis of the vehicle or the part of the vehicle, the control device including: a simulation signal generation control unit that is provided on a line between the sensor and the electronic control device, and that outputs a simulation signal simulating an output signal from the sensor; and a storage unit that stores therein the generated simulation signal and an output signal output from the electronic control device in response to an input of the simulation signal, in a manner associated with each other.

Furthermore, a test method according to the present invention is a method of testing a test piece that is a vehicle or a part of the vehicle that includes a sensor and an electronic control device having a vehicle diagnostic function that acquires an output signal from the sensor, and makes a diagnosis of the vehicle or the part of the vehicle, the method including: causing a control device to control a simulation signal generation device that is provided on a line between the sensor and the electronic control device, and that outputs a simulation signal simulating an output signal from the sensor to the electronic control device, to generate the simulation signal; and storing the generated simulation signal and an output signal output from the electronic control device in response to an input of the simulation signal, in a manner associated with each other.

Furthermore, a test system program according to the present invention is a test system program for testing a test piece that is a vehicle or a pan of the vehicle that includes a sensor and an electronic control device having a vehicle diagnostic function that acquires an output signal from the sensor, and that makes a diagnosis of the vehicle or the part of the vehicle, the program causing a computer to exert a function as a simulation signal generation device that is provided on a line between the sensor and the electronic control device, and that outputs a simulation signal simulating the output signal from the sensor to the electronic control device, a control unit that controls the simulation signal generation device to generate a simulation signal, and a storage unit that stores therein the generated simulation signal and an output signal output from the electronic control device in response to an input of the simulation signal, in a manner associated with each other.

With such a control device, test method, and test system program according to the present invention, it is possible to achieve actions and advantageous effects that are the same as those achieved by the test system according the present invention described above.

Advantageous Effects of Invention

According to the present invention configured as described above, it is possible to conduct a test for verifying the vehicle diagnostic function included in an electronic control device without requiring advanced skills or know-hows.

REFERENCE SIGNS LIST 100 test system
1 vehicle
11 sensor
12 electronic control device
2 simulation signal generation device
54 simulation signal generation control unit (control unit)
56 test result storage unit (storage unit)

DESCRIPTION OF EMBODIMENTS

A test system 100 according to an embodiment of the present invention will now be explained with reference to some drawings.

The test system 100 according to the present embodiment causes a vehicle 1 that is a test piece to drive in a predetermined driving pattern in a test room, and simulates an abnormal condition of the driving vehicle 1, e.g., by blocking signals from a plurality of sensors 11 included in the vehicle 1, and verifies whether the vehicle diagnostic function (e.g., on-board diagnostics (OBD)) included in an electronic control device 12 (e.g., engine control unit (ECU)) mounted on the vehicle 1 works properly. Specifically, the test system 100 according to the present embodiment is configured to verify whether a failure diagnostic function for making diagnosis of a failure of a vehicle is functioning properly, as a vehicle diagnostic function provided to the electronic control device 12. Examples of the sensors 11 included in the vehicle include, but are not limited to, an Oz sensor, a water temperature sensor, an intake air temperature sensor, a throttle sensor, an intake air pressure sensor, an air flow sensor, a vehicle speed sensor, a crank angle sensor, a cam angle sensor, an air conditioning system, and sensors used for assisting driving or automatic driving.

Figure 1:
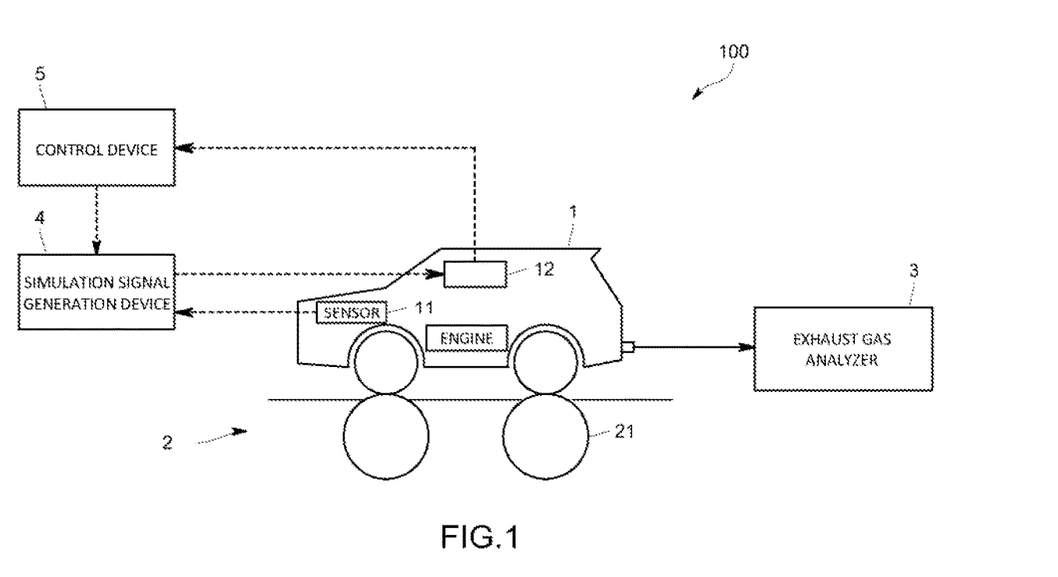
FIG. 1 is a diagram schematically illustrating an overall configuration of a test system according to a present embodiment.

Specifically, as illustrated in FIG. 1, the test system 100 includes a drive test device 2 that carries out a drive test by driving an engine of the vehicle 1, an exhaust gas analyzer 3 that collects and analyzes exhaust gas emitted from the vehicle 1, a simulation signal generation device 4 that generates a simulation signal simulating an output signal from a sensor, and a control device 5 that controls these devices.

The drive test device 2 according to the present embodiment tests the vehicle 1 that is driving, and, specifically, is a chassis dynamometer. The chassis dynamometer 2 is, for example, a biaxial dynamometer, and includes rollers 21 where the wheels of the vehicle 1 are placed, respectively, and a motor (not illustrated) connected to the rollers 21. The motor is configured to apply a driving load that is similar to that applied on a road to the vehicle 1, based on a predetermined control signal received from the control device 5.

The test system 100 according to the present embodiment further includes an automatic driving robot 6 that conducts a driving test of the vehicle 1 on the chassis dynamometer 2. The automatic driving robot 6 is installed in a driver's seat of the vehicle 1, for example, and includes a plurality of actuators for operating an accelerator pedal, a brake pedal, a clutch pedal (MT only), a shift lever, an ignition key, and the like of the vehicle 1. The automatic driving robot 6 is configured in such a manner that each of the actuators operates to drive the vehicle 1 autonomously, based on a predetermined control signal received from the control device 5.

The exhaust gas analyzer 3 is equipped with a plurality of gas analyzers using different measurement principles, respectively, and can keep measuring components such as HC, NOx, CO, and $CO_2$ contained in the exhaust gas from the engine. In the present embodiment, the exhaust gas analyzer 3 is also enabled to measure the weights of CO, HC, NO, or the like per unit distance travelled, by being combined with an exhaust gas constant volume sampling device (not illustrated) that dilutes the exhaust gas with the atmosphere, and collects samples of a constant volume of the diluted exhaust gas, as a sample gas.

Figure 2:
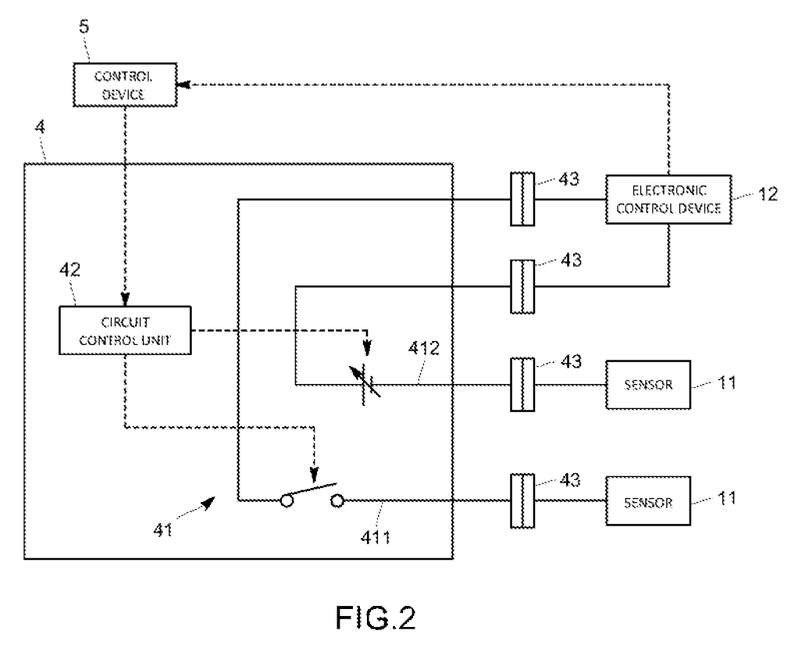
FIG. 2 is a diagram schematically illustrating a configuration of a simulation signal generation device included in the test system according to the embodiment.

The simulation signal generation device 4 is connected to the line between the sensors 11 and the electronic control device 12 by connectors 43, respectively. Specifically, as illustrated in FIG. 2, this simulation signal generation device 4 includes a simulation signal generation circuit 41 serially connected to the sensors 11 and to the electronic control device 12, and a circuit control unit 42 that controls the simulation signal generation circuit 41.

The simulation signal generation circuit 41 includes a cutoff circuit unit 411 that blocks output signals from the sensors 11 to the electronic control device 12, and an abnormality simulation signal generation circuit unit 412 that outputs an abnormality simulation signal simulating an abnormal condition of the sensors 11 to the electronic control device 12, instead of the output signal from the sensors 11. The cutoff circuit unit 411 is configured to block an output signal from the sensor 11 to the electronic control device 12, by opening and closing a cutoff switch. The abnormality simulation signal generation circuit unit 412 is configured to convert an output signal from the sensor 11 into a signal exhibiting a behavior different from that under a normal condition, and to output the resultant signal to the electronic control device 12. For example, the abnormality simulation signal generation circuit unit 412 may make the output signal from the sensor 11 higher or lower, or change the shape of the output signal into a wave-like shape.

The circuit control unit 42 is a dedicated or general-purpose computer including a CPU, an internal memory, an input/output interface, and an A/D converter. The simulation signal generation circuit 41 is controlled based on a predetermined program stored in the internal memory, and may be switched to output the output signal of the sensor 11 to the electronic control device 12 as it is; to block the output signal of the sensor 11; or to output an abnormality simulation signal to the electronic control device 12.

Figure 3:
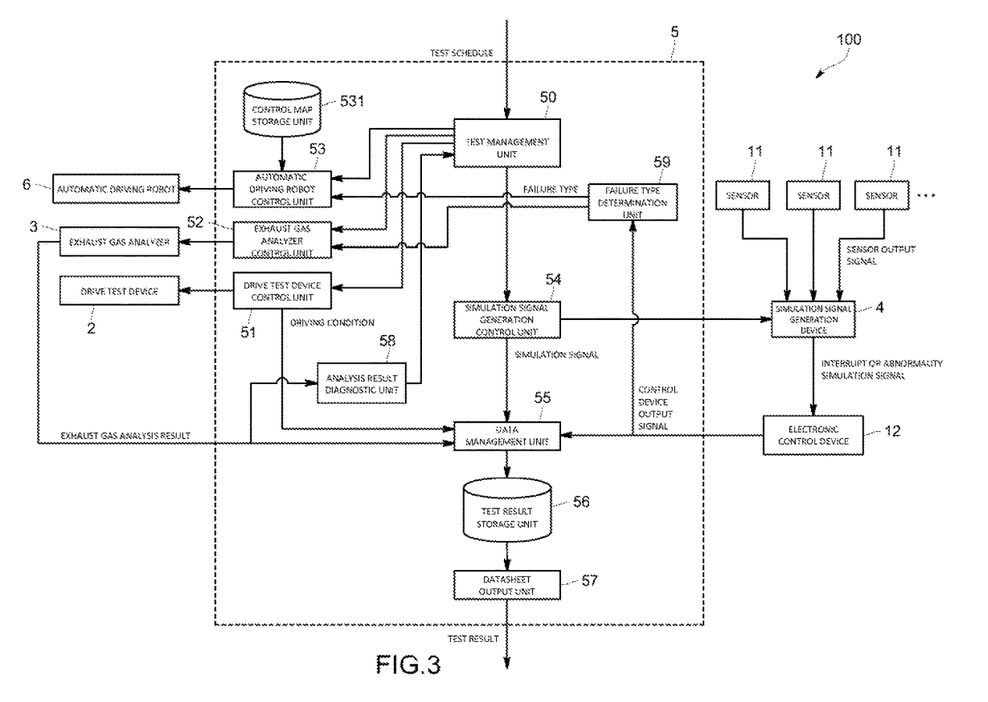
FIG. 3 is a functional block diagram of the test system according to the embodiment.

The control device 5 is a dedicated or general-purpose computer including a CPU, an internal memory, an input/output interface, and an A/D converter. By causing the CPU and the peripheral devices to cooperate with each other based on a predetermined program stored in the internal memory, the control device 5 exerts the functions of at least a drive test device control unit 51, an automatic driving robot control unit 53, a control map storage unit 531, and an exhaust gas analyzer control unit 52, as illustrated in FIG. 3.

The drive test device control unit 51 transmits a predetermined control signal to the motor in the chassis dynamometer 2 so as to cause the vehicle 1 placed on the chassis dynamometer 2 to drive in a predetermined driving mode.

The automatic driving robot control unit 53 is configured to cause the vehicle 1 to drive autonomously, by referring to the control map stored in the control map storage unit 531, and transmitting a control signal to each of the actuators in the automatic driving robot 6.

The control map storage unit 531 stores therein a plurality of different control maps for controlling the automatic driving robot 6. The control map is data indicating a correlation between each of various different accelerator positions of the vehicle 1, and the speed and the acceleration of the vehicle, and is calculated in advance through driving training. The automatic driving robot 6 itself may include the functions of the automatic driving robot control unit 53 and the control map storage unit 531.

The exhaust gas analyzer control unit 52 transmits a control signal to the exhaust gas analyzer 3 to control operations such as starting and ending a measurement of the engine exhaust gas, and running a purge operation.

As illustrated in FIG. 3, the test system 100 according to the present embodiment is configured in such a manner that the control device 5 also functions as a test management unit 50, a simulation signal generation control unit 54 (that is a control unit as mentioned in the claims), a data management unit 55, a test result storage unit 56 (that is a storage unit as used in the claims), and a datasheet output unit 57 so that the test can be easily performed without requiring advanced skills or know-hows.

The test management unit 50 manages a test schedule. Specifically, the test management unit 50 stores therein a test schedule set by an input made by an operator. This test schedule includes an order in which of a plurality of test items in the test are executed, and how test devices are to be operated in the respective test items. The test management unit 50 then outputs command signals to the drive test device control unit 51, the exhaust gas analyzer control unit 52, the automatic driving robot control unit 53, and the simulation signal generation control unit 54, based on the stored test schedule, and controls these devices so that each of the test items included in the test is performed automatically (that is, a batch test is performed automatically) in accordance with the set schedule. The test management unit 50 is enabled to receive an input from an operator while a test is being executed, and to add a test item to a test schedule being managed thereby.

The simulation signal generation control unit 54 then controls to cause the simulation signal generation device 4 to generate a simulation signal. The test system 100 according to the present embodiment has the function of the simulation signal generation control unit 54.

Therefore, the task of generating a simulation signal using the simulation signal generation device 4 can be automated. Specifically, based on the command signal received from the test management unit 50, the simulation signal generation control unit 54 outputs a control signal for instructing to block an input signal from the sensor 11, or to output an abnormality simulation signal to the electronic control device 12, to the circuit control unit 42 included in the simulation signal generation device 4, in accordance with the test schedule.

The data management unit 55 acquires the simulation signal generated by the simulation signal generation control unit 54 from the simulation signal generation control unit 54, and acquires an output signal (also referred to as an electronic control device output signal) having been output from the electronic control device 12 at the time when the simulation signal is generated, from the electronic control device 12. The data management unit 55 then stores the acquired simulation signal and the electronic control device output signal in the test result storage unit 56, in a manner associated with each other. Note that the output signal output from the electronic control device 12 in response to an input of the simulation signal includes a flag for distinguishing whether the electronic control device 12 has determined a failure of the vehicle.

The data management unit 55 also receives behavior information indicating the behavior of the vehicle 1 in response to an input of the simulation signal to the electronic control device 12, and stores the behavior information in the test result storage unit 56 in a manner associated with the simulation signal and the electronic control device output signal. Specifically, the data management unit 55 receives, as the behavior information, information indicating a driving condition (also referred to as driving condition information) from the drive test device control unit 51, and receives information indicating a result of analyzing the exhaust gas (also referred to as exhaust gas analysis result information) from the exhaust gas analyzer 3. The data management unit 55 then stores the received driving condition information and the exhaust gas analysis result information in the test result storage unit 56, in a manner associated with the simulation signal and the electronic control device output signal.

The test result storage unit 56 is set in a predetermined area of the memory, and stores therein at least the simulation signal and the output signal from the electronic control device 12 in a manner associated with each other in the temporal order. In addition to these pieces of information, the driving information and the exhaust gas analysis result information are also stored in the temporal order, in a manner associated with the simulation signal and the output signal from the electronic control device 12.

The datasheet output unit 57 refers to the test result storage unit 56, and issues a datasheet (certificate) for proving the test result of the test having been conducted. In the datasheet, at least the simulation signal and the output signal from the electronic control device are described in the temporal order. This datasheet may also describe the behavior information (such as the vehicle speed, oil and water temperatures, exhaust gas analysis result, and power consumption).

The control device 5 according to the present embodiment may also have functions as an analysis result diagnostic unit 58 and a failure type determination unit 59.

The analysis result diagnostic unit 58 analyzes a result of a measurement in the test, and determines whether the test is to be interrupted, based on the analysis result. In the present embodiment, the analysis result diagnostic unit 58 determines whether to interrupt the test by making a diagnosis of the exhaust gas analysis result of the exhaust gas analyzer 3. Specifically, the analysis result diagnostic unit 58 acquires the exhaust gas analysis result from the exhaust gas analyzer 3, and monitors variations in the amount of exhaust gas (and/or the concentration of exhaust gas) emitted from the vehicle 1 in real time. The amount of exhaust gas (and/or the concentration of exhaust gas) is compared with a predetermined threshold (upper boundary as defined in the regulatory stipulation). If the amount of exhaust gas (and/or the concentration of exhaust gas) is higher than the predetermined threshold, a command signal is transmitted to the test management unit 50 to interrupt the test. Upon receiving this command signal, the test management unit 50 transmits control signals to the drive test device control unit 51, the exhaust gas analyzer control unit 52, the automatic driving robot control unit 53, and the simulation signal generation control unit 54 so as to interrupt the current process in the test schedule, and move to the next process.

The failure type determination unit 59 acquires an electronic control device output signal from the electronic control device 12 in real time, and determines a failure type of the vehicle 1 diagnosed by the electronic control device 12, based on the electronic control device output signal. The failure type determination unit 59 then sequentially transmits information indicating the determined failure type (also referred to as failure type information) to the automatic driving robot control unit 53.

The automatic driving robot control unit 53 is configured to, upon receiving the failure type information, switch the control map to be referred to from the control map storage unit 531, based on the failure type. Specifically, the control map storage unit 531 stores therein a plurality (e.g., three) of types of control maps corresponding to preset failure levels (e.g., three stages) of the vehicle 1. The automatic driving robot control unit 53 then determines the failure level of the acquired failure type, and controls the automatic driving robot 6 by referring to the control map corresponding to the determined failure level.

The failure type determination unit 59 also sequentially transmits the determined failure type information to the exhaust gas analyzer control unit 52.

Upon receiving the failure type information, the exhaust gas analyzer control unit 52 transmits a control signal to cause the exhaust gas analyzer 3 to execute a purge operation based on the failure type. Specifically, types of failures (contamination failure type) that might cause an introduction of the high-concentration exhaust gas into the exhaust gas analyzer 3 are stored in the exhaust gas analyzer control unit 52 in advance. When the failure type indicated by the received failure type information belongs to the stored contamination failure types, the exhaust gas analyzer control unit 52 causes the analyzer 3 to execute the purge operation.

With the test system 100 according to the present embodiment configured as described above, the simulation signal generation device is controlled by the control unit to generate the simulation signal, and the generated simulation signal and the output signal output from the electronic control device 12 in response to an input of the simulation signal are recorded in the test result storage unit 56 in a manner associated with each other. Therefore, it is possible to use a computer to automate the tasks of generating the simulation signal and of recording the output signal output from the electronic control device 12 at that time, which have been conventionally performed manually by the examiner while driving the vehicle 1. In this manner, it is possible to easily perform a test for verifying the vehicle diagnostic function (the failure diagnostic function in the present embodiment) of the electronic control device 12 without requiring advanced skills or know-hows.

In addition, the test management unit 50 manages the schedule of the test, controls the simulation signal generation device 4, the drive test device 2, the automatic driving robot 6, and the exhaust gas analyzer 3 to conduct the test automatically accordance with the set schedule, and further includes the datasheet output unit 57 that outputs a datasheet indicating a test result including the simulation signal and the output signal from the electronic control device 12, the output signal being associated with the simulation signal. Therefore, it is possible to automate the generation of the simulation signal in the test, driving of the vehicle 1, the analysis of the exhaust gas, and the recording and checking of the test.

Note that the present invention is not limited to the embodiment described above.

Figure 4:
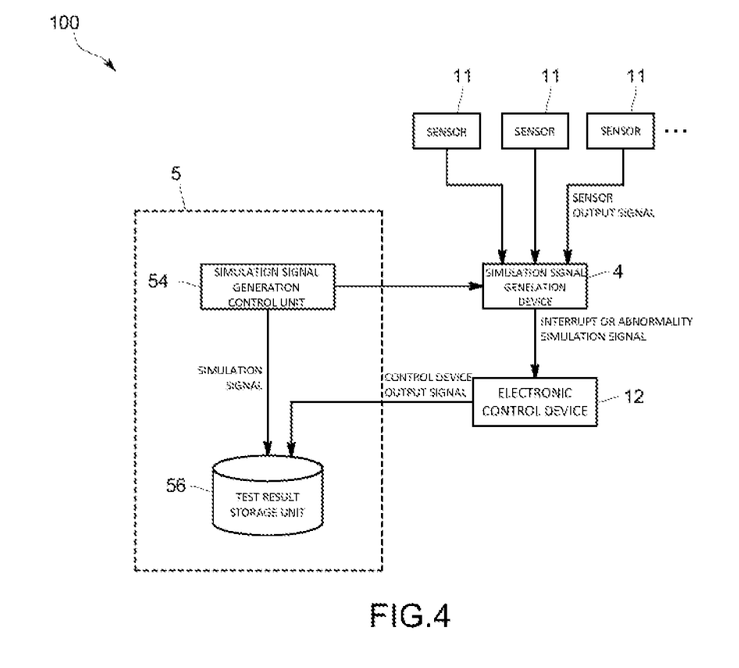
FIG. 4 is a functional block diagram of a test system according to another embodiment.

For example, as illustrated in FIG. 4, a test system 100 according to another embodiment may include at least a simulation signal generation device 4 that generates a simulation signal simulating an output signal from a sensor 11 included in a test piece, and a control device 5 that controls the simulation signal generation device 4. The control device 5 may be configured to at least exert a function as the simulation signal generation control unit 54 that controls to cause the simulation signal generation device 4 to generate a simulation signal, and the test result storage unit 56 that stores therein the generated simulation signal and the output signal output from the electronic control device 12 in the test piece, in response to an input of the simulation signal, in a manner associated with each other. The test system 100 according to the other embodiment configured as described above can also achieve the advantageous effects according to the present invention. In other words, the simulation signal generation control unit 54 can control to cause the simulation signal generation device 4 to generate a simulation signal, and record the generated simulation signal and the output signal output from the electronic control device 12 in response to an input of the simulation signal in the test result storage unit 56 in a manner associated with each other. Therefore, it is possible to use a computer to automate the tasks of generating the simulation signal and of recording the output signal output from the electronic control device 12 at that time. As a result, it is possible to carry out the test for verifying the vehicle diagnostic function of the electronic control device 12 easily, without requiring advanced skills or know-hows.

Note that the vehicle is not necessarily limited to a completed vehicle, and may be a part of the vehicle as long as the vehicle includes at least the electronic control device. For example, as long as a part of the vehicle includes an engine (or a motor), the electronic control device 12, and the sensor 11, a part of the vehicle 1 may be used as a test piece, or a power train may be used as a test piece.

Furthermore, according to the above embodiment, the drive test device 2 is a chassis dynamometer, but is not limited thereto. The drive test device 2 according to another embodiment may be a dynamometer for testing a powertrain of the vehicle 1 or a dynamometer for testing an engine or a motor.

The vehicle 1 according to the embodiment described above includes the engine, but the present invention is not limited thereto. The vehicle 1 according to another embodiment may be, for example, an electric vehicle (EV), a plug-in hybrid vehicle (PHV), a fuel cell vehicle, or the like that is driven by a motor using electricity as an energy source. In this case, the simulation signal generation device 4 may be configured to generate a simulation signal simulating an output signal from a temperature sensor that detects the temperature of a motor, a battery, a fuel cell, or the like.

In addition, in the test system 100 according to another embodiment, as long as the control device 5 includes at least the functions of the simulation signal generation control unit 54 and the test result storage unit 56, the other functions described above may be omitted in the control device 5. For example, when it is not necessary to measure the exhaust gas, the test system 100 according to another embodiment does not need to include the exhaust gas analyzer control unit 52 and the exhaust gas analyzer 3.

In the test system 100 according to the embodiment described above, all of the simulation signal generation device 4, the drive test device 2, the exhaust gas analyzer 3, and the automatic driving robot 6 are automatically operated based on the test schedule set by the test management unit 50, but the present invention is not limited thereto. According to another embodiment, only some of these devices may operate automatically based on the test schedule. Alternatively, in another embodiment, an operator him/herself may operate the devices described above, without using the test management unit 50.

In the test system 100 according to the embodiment described above, the vehicle 1 is driven by the automatic driving robot 6, but the present invention is not limited thereto, and an examiner who is a person may drive the vehicle 1. The test system 100 according to another embodiment may not include the drive test device 2 or the exhaust gas analyzer 3.

The simulation signal generation device 4 according to the embodiment described above outputs an analog signal to the electronic control device 12, but the present invention is not limited thereto, and may be configured to output a digital signal.

In another embodiment, the functional units exerted by the control device 5 may be exerted by a different device.

In addition, another test system 100 may be configured to, when the vehicle 1 is an EV or a PHV, automatically adjust the temperature in a soak room, adjust preconditions of the drive test device 2, and adjust a state of charge (SOC). When these adjustments are completed and conditions for starting the test are satisfied, the test management unit 50 may then transmit control signals to the control units 51, 52, 53, and 54, respectively, to automatically start the test.

The test system 100 according to the embodiment described above is used to verify whether the failure diagnostic function of the electronic control device 12 mounted on the vehicle 1 works properly, but the present invention is not limited thereto. In another embodiment, the test system 100 may be used in a development conformity stage of the electronic control device 12, and used to determine a threshold for a failure diagnostic function such as OBD to diagnose a failure. The present invention is not limited to the failure diagnostic function, and may be used to verify whether any other vehicle diagnostic function works properly.

A test system 100 according to still another embodiment may be configured to store therein results of previous development conformity tests. Specifically, test items and test results, including a vehicle type and an engine type of the vehicle 1 subjected to the development conformity test, may be stored. The test management unit 50 may be configured to compare the test schedule input by an operator with the stored development conformity test result, and automatically omit the test items having already been tested.

In addition, the present invention is not limited to the above embodiment, and it should be needless to say that various modifications can be made within the scope not departing from the gist according to the present invention.

INDUSTRIAL APPLICABILITY

With the test system according to the present invention described above, it is possible to easily perform a test for verifying the vehicle diagnostic function of an electronic control device, without requiring advanced skills or know-hows.

The invention claimed is:

1. A test system for testing a test piece that is an actual vehicle or a part of an actual vehicle, including an actual engine or motor, a plurality of actual sensors, and an actual electronic control device having a vehicle diagnostic function that acquires an output signal from the actual sensors and makes a diagnosis of the test piece, the test system comprising:

a chassis dynamometer on which the test piece is placed and on which a driving test of the test piece is performed;

a simulation signal generation device that is provided on lines between the actual sensors and the actual electronic control device, and that outputs a simulation signal simulating an output signal from the actual sensors to the actual electronic control device;

a control unit that controls the simulation signal generation device to generate the simulation signal while the test piece is undergoing the driving test on the chassis dynamometer and the actual engine or motor is being driven, and to selectively block output signals from the actual sensors or to selectively output an abnormality simulation signal simulating abnormality of the actual sensors to the actual electronic control device; and a storage unit that stores therein the simulation signal and an output signal that is output from the actual electronic control device in response to an input of the simulation signal, including a flag for distinguishing whether the actual electronic control device has determined a failure of the test piece, in a manner associated with each other.

2. The test system according to claim 1, wherein the storage unit further stores therein behavior information indicating a behavior of the test piece in response to an input of the simulation signal, in a manner associated with the behavior information.

3. The test system according to claim 1, wherein the storage unit stores therein information indicating a driving condition of the test piece in response to an input of the simulation signal, as behavior information.

4. The test system according to claim 3, further comprising an automatic driving robot that drives the test piece, wherein the control unit outputs the simulation signal to the actual electronic control device while the automatic driving robot is driving the test piece.

5. The test system according to claim 4, wherein
the actual electronic control device has a function for making a diagnosis of a failure of the test piece as the vehicle diagnostic function, and
the test system further comprises:
a control map storage unit that stores therein a plurality of control maps for controlling the automatic driving robot;
an automatic driving robot control unit that controls the automatic driving robot by referring to the control maps; and
a failure type determination unit that receives an output signal from the actual electronic control device, and determines a type of failure in the test piece, wherein the automatic driving robot control unit is configured to switch the control maps to be referred to, based on the type of failure.

6. The test system according to claim 1, further comprising an exhaust gas analyzer configured to analyze exhaust gas emitted from the test piece, wherein the storage unit stores therein information indicating an analysis result output from the exhaust gas analyzer in response to an input of the simulation signal, as behavior information.

7. The test system according to claim 6, further comprising a test management unit configured to manage a schedule of a test for the actual electronic control device, wherein the test management unit outputs a command signal to the control unit in accordance with the schedule and performs control to automatically run a test of the actual electronic control device in accordance with the schedule.

8. The test system according to claim 7, further comprising an analysis result diagnostic unit that acquires an analysis result of the exhaust gas analyzer, and makes a diagnosis of the analysis result, in real time, wherein the test management unit interrupts the test depending on a diagnosis result of the analysis result diagnostic unit.

9. The test system according to claim 1, wherein the storage unit stores therein the simulation signal and an output signal output from the actual electronic control device in response to an input of the simulation signal in a temporal order.

10. The test system according to claim 1, further comprising a datasheet output unit that outputs a datasheet indicating a test result including the simulation signal and an output signal from the actual electronic control device, the simulation signal and the output signal being associated and stored in the storage unit.

11. A control device for testing a test piece that is an actual vehicle or a part of an actual vehicle, including an actual engine or motor, a plurality of actual sensors and an actual electronic control device having a vehicle diagnostic function that acquires an output signal from the actual sensors and makes a diagnosis of the test piece, the control device comprising:
a simulation signal generation control unit that is provided on lines between the actual sensors and the actual electronic control device, and that outputs a simulation signal simulating an output signal from the actual sensors while the test piece is undergoing a driving test on a chassis dynamometer and the actual engine or motor is being driven, and that selectively blocks output signals from the actual sensors or selectively outputs an abnormality simulation signal simulating abnormality of the actual sensors to the actual electronic control device; and
a storage unit that stores therein the simulation signal and an output signal output from the actual electronic control device in response to an input of the simulation signal, including a flag for distinguishing whether the actual electronic control device has determined a failure of the test piece, in a manner associated with each other.

12. A test method for testing a test piece that is an actual vehicle or a part of an actual vehicle, including an actual engine or motor, a plurality of actual sensors, and an actual electronic control device having a vehicle diagnostic function that acquires an output signal from the actual sensors and makes a diagnosis of the test piece, the method including:
causing a control device to control a simulation signal generation device that is provided on lines between the actual sensors and the actual electronic control device and that outputs a simulation signal simulating an output signal from the actual sensors to the actual electronic control device, to generate a simulation signal while the test piece is undergoing a driving test on a chassis dynamometer and the actual engine or motor is being driven, and to selectively block output signals from the actual sensors or to selectively output an abnormality simulation signal simulating abnormality of the actual sensors to the actual electronic control device; and
storing the simulation signal and an output signal output from the actual electronic control device in response to an input of the simulation signal, including a flag for distinguishing whether the actual electronic control device has determined a failure of the test piece, in a manner associated with each other.

13. A non-transitory computer readable medium for testing a test piece that is an actual vehicle or a part of an actual vehicle, including an actual engine or motor, a plurality of actual sensors, and an actual electronic control device having a vehicle diagnostic function that acquires an output signal from the actual sensors and makes a diagnosis of the test piece, the non-transitory computer readable medium having instructions thereon that, when executed by a computer, cause the computer to exert functions as:

a simulation signal generation device that is provided on lines between the actual sensors and the actual electronic control device, and that outputs a simulation signal simulating an output signal from the actual sensors to the actual electronic control device;

a control unit that controls the simulation signal generation device to generate the simulation signal while the test piece is undergoing a driving test on a chassis dynamometer and the actual engine or motor is being driven, and to selectively block output signals from the actual sensors or to selectively output an abnormality simulation signal simulating abnormality of the actual sensors to the actual electronic control device; and a storage unit that stores therein the simulation signal and an output signal output from the actual electronic control device in response to an input of the simulation signal, including a flag for distinguishing whether the actual electronic control device has determined a failure of the test piece, in a manner associated with each other.

\* \* \* \* \*